(12) United States Patent
Merten et al.

(10) Patent No.: US 8,020,257 B2
(45) Date of Patent: Sep. 20, 2011

(54) ENGINE PULL START HANDLE

(75) Inventors: David J. Merten, Manitowoc, WI (US); Jay Z. Muchin, Manitowoc, WI (US)

(73) Assignee: M Group, Inc., Manitowoc, WI (US)

( * ) Notice: Subject to any disclaimer, the term of this patent is extended or adjusted under 35 U.S.C. 154(b) by 293 days.

(21) Appl. No.: 11/779,854

(22) Filed: Jul. 18, 2007

(65) Prior Publication Data

US 2008/0016654 A1 Jan. 24, 2008

Related U.S. Application Data

(60) Provisional application No. 60/832,493, filed on Jul. 21, 2006.

(51) Int. Cl.
*A47H 11/04* (2006.01)

(52) U.S. Cl. ........................................ 16/442

(58) Field of Classification Search ............ 16/442, 16/436, 437, 405, 406–430, 111.1; 24/127–130, 24/712; 123/185.2, 185.3; 482/126, 139; 294/166, 171

See application file for complete search history.

(56) References Cited

U.S. PATENT DOCUMENTS

| | | | | | |
|---|---|---|---|---|---|
| 2,722,209 | A | * | 11/1955 | Pillow | 123/185.4 |
| 3,375,813 | A | * | 4/1968 | Hamman | 123/185.2 |
| 3,635,382 | A | * | 1/1972 | Wilson | 294/166 |
| 4,004,722 | A | * | 1/1977 | Olivier | 294/171 |
| 5,029,926 | A | * | 7/1991 | Dieterich, Jr. | 294/171 |
| 5,086,545 | A | * | 2/1992 | Suzuki | 24/67 R |
| 5,153,967 | A | * | 10/1992 | Zimmermann et al. | 16/442 |
| 6,920,666 | B1 | * | 7/2005 | Chen | 16/113.1 |
| 2006/0105893 | A1 | * | 5/2006 | Chen | 482/126 |

OTHER PUBLICATIONS

Mercurcy Outboards Service Manual 90-827242R1, Section 8, (May 1998).*

* cited by examiner

*Primary Examiner* — Victor Batson
*Assistant Examiner* — Matthew Sullivan
(74) *Attorney, Agent, or Firm* — Rathe Patent & IP Law (57) ABSTRACT

An apparatus and a method relating to a handle having a neck portion having a throat extending along an axis and having a reduced axial opening and a slit extending along the throat and alongside the axial opening are disclosed.

14 Claims, 7 Drawing Sheets

ENGINE PULL START HANDLE

CROSS-REFERENCE TO RELATED PATENT APPLICATIONS

The present application claims priority under 35 USC 119 from U.S. Provisional Application Ser. No. 60/832,493 filed on Jul. 21, 2006 by David J. Merten and Jay Z. Muchin and entitled ENGINE PULL START HANDLE, the full disclosure of which is hereby incorporated by reference.

BACKGROUND

Many devices include engines having recoil cables that may be pulled to start the engines. Starting the engine by pulling the cable may be difficult. This difficulty is exacerbated by poorly designed handles which are difficult and uncomfortable to grip. Replacing such handles is also difficult. Severing an existing handle from the cord of the recoil cable to replace the handle may result in the entire cord being recoiled back into the engine without any attached handle.

DETAILED DESCRIPTION OF THE EXAMPLE EMBODIMENTS

Figure 1:
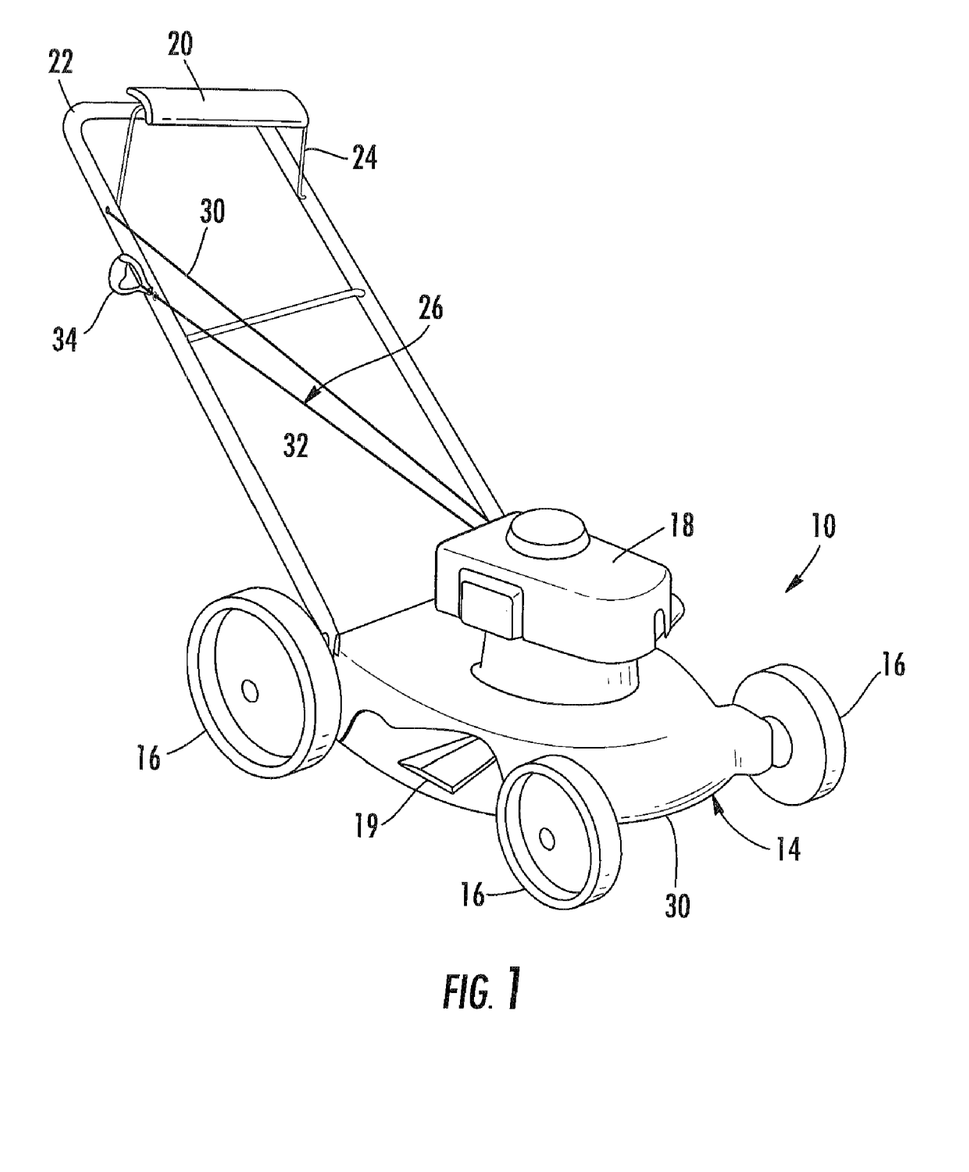
FIG. 1 is a perspective view of a powered appliance including a handle according to an example embodiment.

FIG. 1 is a perspective view of one example of a powered appliance 10 (illustrated as a non-riding powered lawnmower). Powered appliance 10 generally includes chassis or frame 14, wheels 16, engine 18, working member 19, handle 22, control 24 and recoil cable 26. Chassis 14 generally comprises a structure configured to support engine 18 and working member 19. In the particular embodiment illustrated in which powered appliance 10 comprises a non-riding powered lawnmower, chassis 14 additionally includes a cover or shield portion 30 at least partially extending about working member 19. The exact configuration of chassis 14 may vary depending upon the type and function of powered appliance 10.

Wheels 16 are rotatably supported by chassis 14 and are configured to facilitate movement of powered appliance 10. In one embodiment in which powered appliance 10 is self propelled, one or more of wheels 16 may be operationally coupled to a drive train or transmission. In another embodiment in which powered appliance 10 is not self propelled, wheels 16 may freely rotate. In particular applications in which powered appliance 10 is not moved across the ground or other surface, wheels 16 may be omitted.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Engine 18 generally comprises a conventionally known or future developed device configured to provide mechanical energy to power or move at least working member 19. Engine 18 is coupled to working member 19 either directly or by a drive train. Engine 18 is configured to start in response to actuation or pulling of recoil cable 26.

Working member 19 generally comprises a member of powered appliance 10 configured to move to perform a desired task upon the surrounding environment external to the appliance. In the particular embodiment illustrated in which powered appliance 10 comprises a lawnmower, working member 19 comprises a blade which works on the surrounding environment, grass. In alternative embodiments, working member 19 may take a variety of other conventionally known or future developed forms such as the blades or working members of hedge trimmers, tillers, chain saws, edgers, snowblowers, wood choppers and the like. Working member 19 is generally driven by engine 18.

Handle 22 generally comprises a structure extending from chassis 14 configured to be grasped by a user of powered appliance 10 to facilitate manipulation or movement of powered appliance 10. In the particular embodiment illustrated, handle 22 has a generally U-shaped tubular member pivotally coupled to chassis 14. In alternative embodiments, handle 22 may have any one of a variety of alternative configurations depending upon the type of powered appliance 10 in which handle 22 is employed and its function.

Control 24 generally comprises a movable member configured to be held adjacent to or at least near a portion of handle 22 to enable operation of working member 19. When control 24 is moved away from handle 22, movement of working member 19 is either completely stopped or is sufficiently slowed to minimize the risk of injury from accidental contact of an appliance operator with working member 19. In the particular embodiment illustrated in which powered appliance 10 comprises a non-riding lawnmower, control 24 is commonly known as a "kill bar". In other embodiments, control 24 may be omitted.

In the particular embodiment, control 24 is coupled to engine 18 by linkage 30 in a conventionally known fashion. In alternative embodiments, control 24 may be coupled to engine 18 by various other known methods or devices. For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Recoil cable 26 is utilized to start engine 18. Recoil cable 26 generally includes pull cord 32 and handle 34. Cord 32 comprise any elongate flexible woven or non-woven length, having a circular or noncircular cross-section, of one or more materials configured to be coiled about portions of engine 18 and to be secured to handle 34. In one embodiment, cord 32 may comprise a woven or non-woven rope formed from cellulose or polymeric materials or fibers. In one embodiment, cord 32 has a diameter of less than or equal to about 0.5 inches and nominally less than or equal to about 0.25 inches. In other embodiments, cord 32 may be formed from other materials and may have other dimensions.

Handle 24 comprises a structure secured to end of cord 32 and configured to be grasped by one or more hands of a person using powered appliance 10. As will be described in more detail hereafter, handle 34 provides an ergonomic and comfortable grip, facilitating easier pulling of cable 26 and easier starting of engine 18. As will also be described in more detail hereafter, handle 34 is configured to be easily secured to cord 32. Moreover, handle 34 is configured to more easily replace an existing, less comfortable, differently configured handle already connected to cord 32.

In the particular embodiment illustrated, powered appliance 10 comprises a conventionally known non-riding powered lawnmower, whether self propelled or pushed. In other embodiments, powered appliance 10 may comprise other powered appliances having an engine 18 which is configured to utilize a recoil cable 26 to start the engine 18. Examples of such other power appliances having engines at utilize recoil cable 26 for start up include, but are not limited to, snow blowers or snow throwers, weed whackers, chainsaws, go carts, boats and the like. In alternative embodiments, powered appliance may comprise a future developed powered appliance having alternative elements. Those elements provided to powered appliance 10 may have various configurations depending upon the type of powered appliance 10 and its function.

Figure 2:
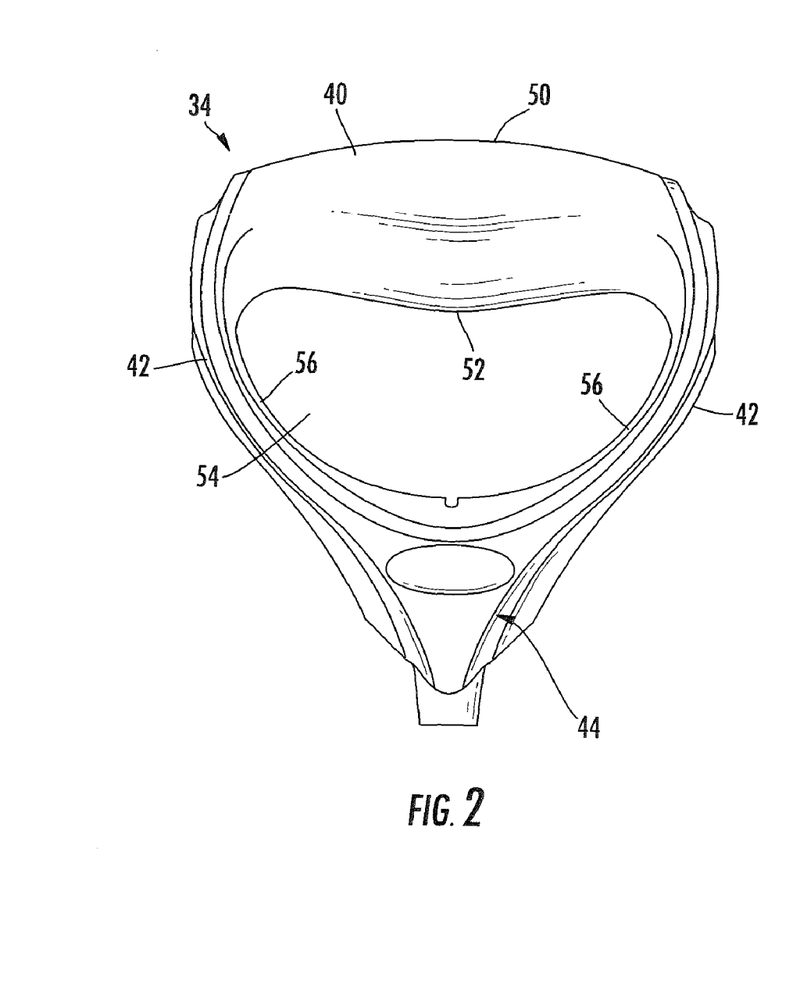
FIG. 2 is a front elevational view of the handle of FIG. 1 according to an example embodiment.
Figure 3:
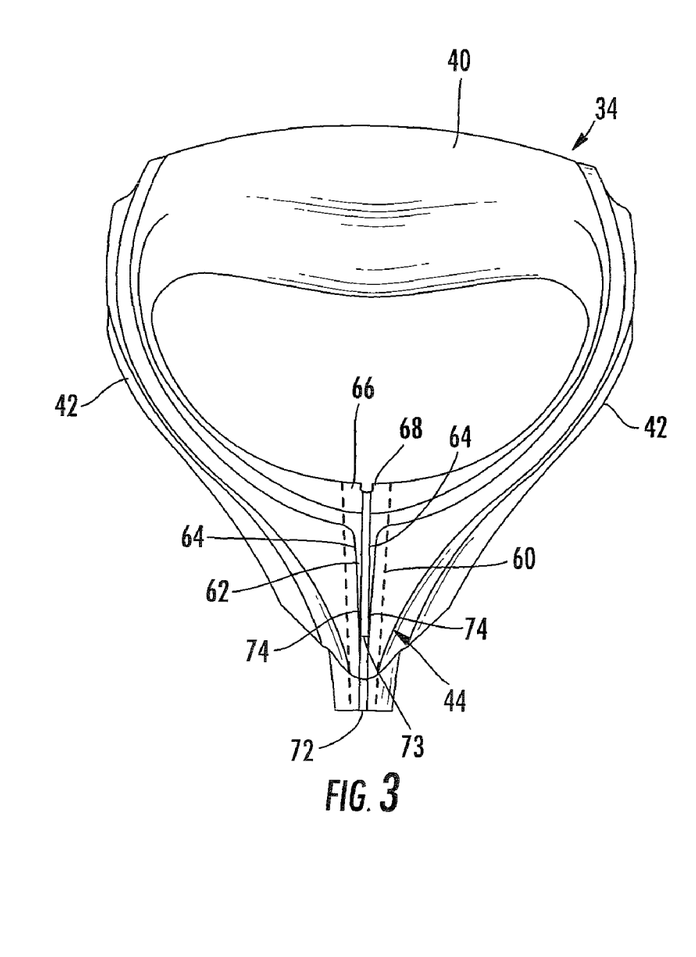
FIG. 3 is a rear elevational view of the handle of FIG. 1 according to an example embodiment.

FIGS. 2 and 3 are front and rear elevational views illustrating handle 34 in more detail. As shown by FIGS. 2 and 3, handle 34 includes beam portion 40, legs 42, and neck portion 44. Beam portion 40 comprises that portion of handle 34 configured to be grasped by a person's fingers being wrapped around or about beam portion 40. In the example illustrated, beam portion 40 is ergonomic to provide a comfortable grip. In particular, beam portion 40 is sized and shaped to fit within a user's palm. In particular, beam portion 40 includes opposite convex surfaces 50 and 52 facilitating a more comfortable grip. The beam portion 40 further includes an elastomeric soft compressible outer surface further enhancing gripability. In other embodiments, beam portion 40 may have other outer surface shapes, may be less ergonomic and may omit the soft compressible or elastomeric outer surface. Although beam portion 40 is illustrated as being largely linear between legs 42, beam portion 40 may alternatively be curved or more circular or ovular in shape between legs 42.

Legs 42 extend from beam portion 40 to neck portion 44. Legs 42 space beam portion 40 from neck portion 44 to form an opening 54 sized to comfortably receive each of a user's four fingers. In the example illustrated, legs 42 have curved inner surfaces such that opening 54 is round and smooth to provide a more comfortable grip. In other embodiment, legs 42 may have other shapes and configurations. In the example illustrated, legs 42 have interior surfaces 56 covered with an elastomeric material to further provide a comfortable grip.

In other embodiments, legs 42 may be omitted, wherein neck portion 44 directly extends from beam portion 40 such that handle 34 has a T or inverted L configuration or shape. In an embodiment where handle 34 has the noted T shape, beam portion 40 maybe split into two portions that extend from an intermediate neck portion 44 such that neck portion 44 forms a top of the handle. In an embodiment where handle 34 has the noted inverted L shape, beam portion 40 may extend from one side of neck portion 44, wherein neck portion 44 forms a top of the handle.

Neck portion 44 extends generally opposite to beam portion 40 and is coupled to beam portion 40 by legs 42. Neck portion 44 is configured to receive cord 32 (shown and described with respect to FIG. 1). Neck portion 44 includes throat 60, slit 62, flaps 64, mouth 66 and lips 68. Throat 60 comprises an elongate passageway extending through neck portion 44 and is configured to receive cord 32 and a head associated with cord 32. The head associated with cord 32 comprises an enlarged portion of cord 32 having a thickness or diameter greater than the remainder of cord 32. For example, the head may comprise a knot tied in cord 32, a ball or other enlarged member secured to cord 32 or a widening or enlargement of cord 32 itself. Throat 60 has a reduced axial opening 72 which provides a constriction 73. Opening 72 is sized to permit passage of cord 32 therethrough and is also sized smaller than the head associated with cord 32 so as to capture the head within throat 60. Portions about axial opening 72 are sufficiently inflexible or are sufficiently rigid to prevent the head from being pulled through axial opening 72 under normal forces encountered during pulling of recoil cable 26 to start engine 18 (shown in FIG. 1).

Slit 62 extends along at least portions of throat 60 and provides a transverse passage or opening through which cord 32 may pass into throat 60. In the particular example illustrated, slit 62 extends along an entire length of throat 60 from mouth 66 to and across axial opening 72. Slit 62 is further configured to retain cord 32 within throat 60 when cord 32 is received within throat 60. In one embodiment, slit 62 has opposite edges 74 which are spaced apart from one another by a distance less than a width of cord 32. In such an embodiment, neck portion 44 is configured to flex in response to forces exerted by cord 32 against such opposite edges 74 such that opposite edges 74 spread to a spacing greater than or equal to the width of cord 32, enabling cord 32 to pass between edges 74 into throat 60. In yet another embodiment, opposite edges 74 are spaced from one another by a distance greater than or equal to a width of cord 32.

Elastomeric flaps 64 extend along side edges 74 and retain cord 32 within throat 60. Flaps 64 resiliently flex during insertion of cord 32 between edges 74. In yet other embodiments, both side edges 74 and flaps 64 may resiliently flex to facilitate insertion of cord 32 into throat 60 and to retain cord 32 in throat 60. Although flaps 64 are illustrated as extending along both opposite sides of slit 62, in other embodiments, a single flap 64 may alternatively extend along one side of slit 62. In yet other embodiments, flaps 64 may be omitted.

Mouth 66 comprises an opening in communication with throat 16. Mouth 66 faces surface 52 of beam portion 40 and is sized to receive a head associated with cord 32. Mouth 66 facilitates reception of the head associated with cord 32 into throat 60. In other embodiments in which slit 62 is configured to facilitate insertion of the head through slit 62 into throat 60, mouth 66 may have reduced size or may be omitted such that the end of throat 60 opposite to opening 72 is closed.

Lips 68 comprise flaps of elastomeric material partially extending over mouth 60. Lips 68 are sufficiently flexible so as to deform to allow insertion of the head into throat 60. Lips 68 resiliently return to their original position and assist in retaining the head within throat 60. In one embodiment, lips 68 and flaps 64 are integrally formed as part of a single unitary body, molded from an elastomeric polymeric material. In the particular embodiment illustrated, flaps 64, lips 68 and the elastomeric material overlying arms 42 and beam portion 40 are integrally formed as a single unitary body molded from elastomeric material. In still other embodiments, lips 68 may be omitted.

Figure 4A:
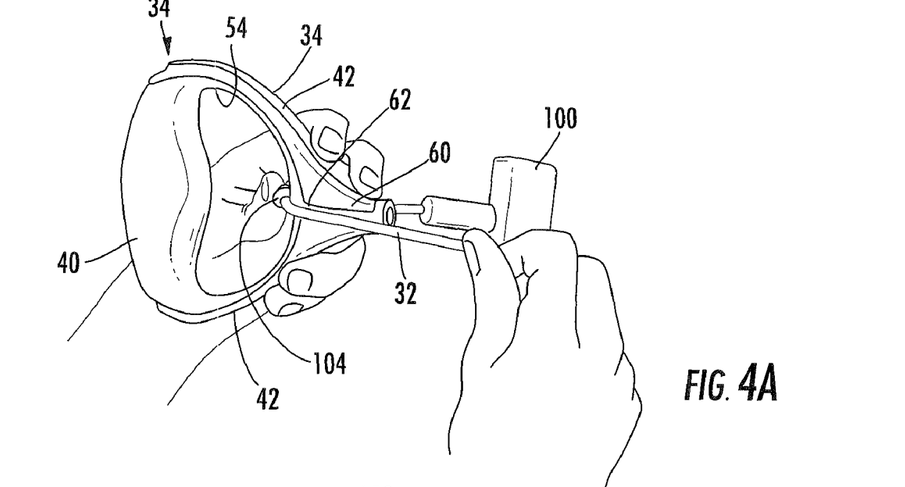
FIGS. 4A-4C illustrate one example method of replacing an existing handle of a powered appliance with the handle of FIG. 1 according to an example embodiment.
Figure 4B:
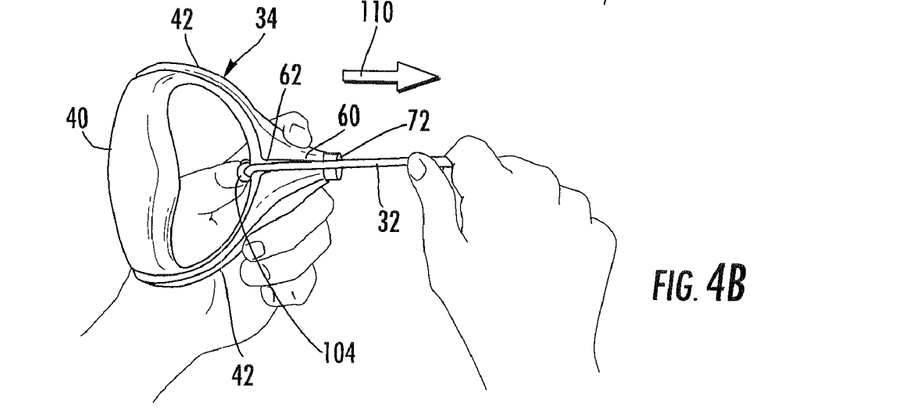
Figure 4C:
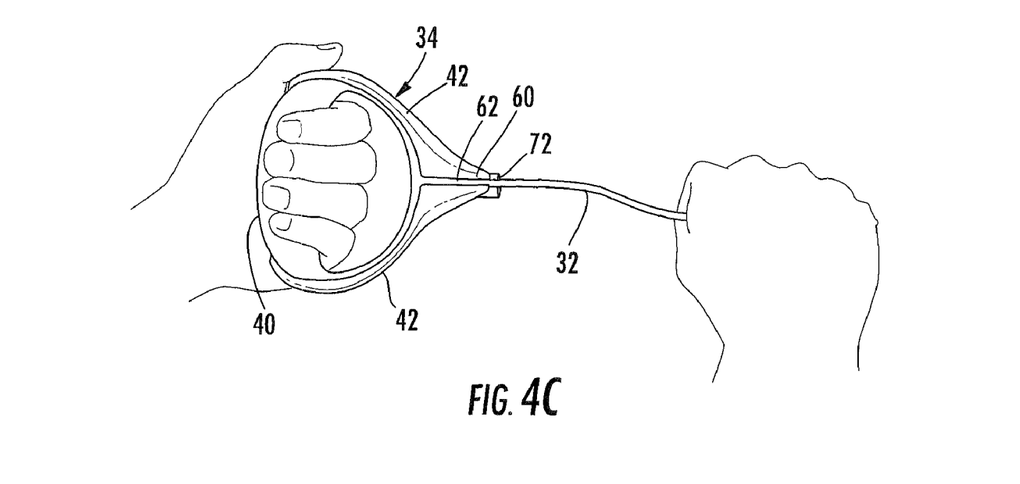
Figure 5:
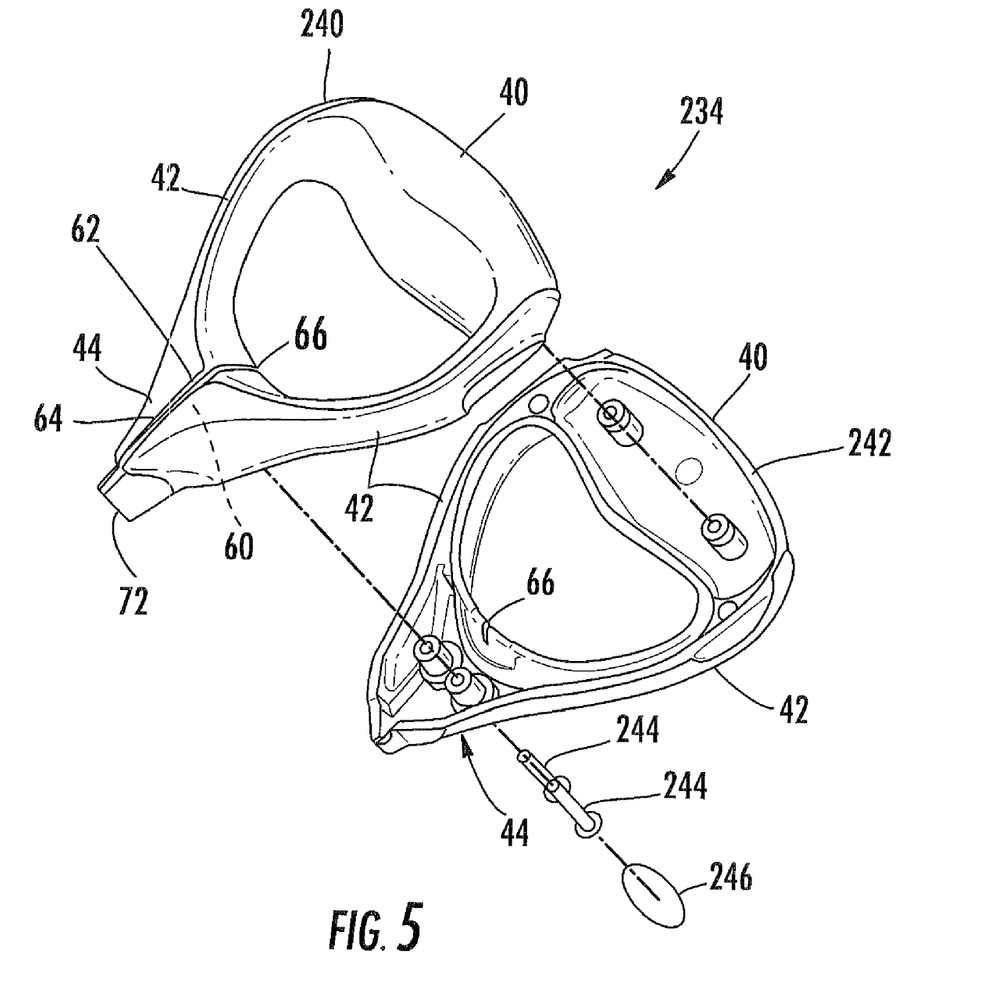
FIG. 5 is an exploded rear perspective view of another embodiment of the handle of FIG. 1 according to an example embodiment.
Figure 6:
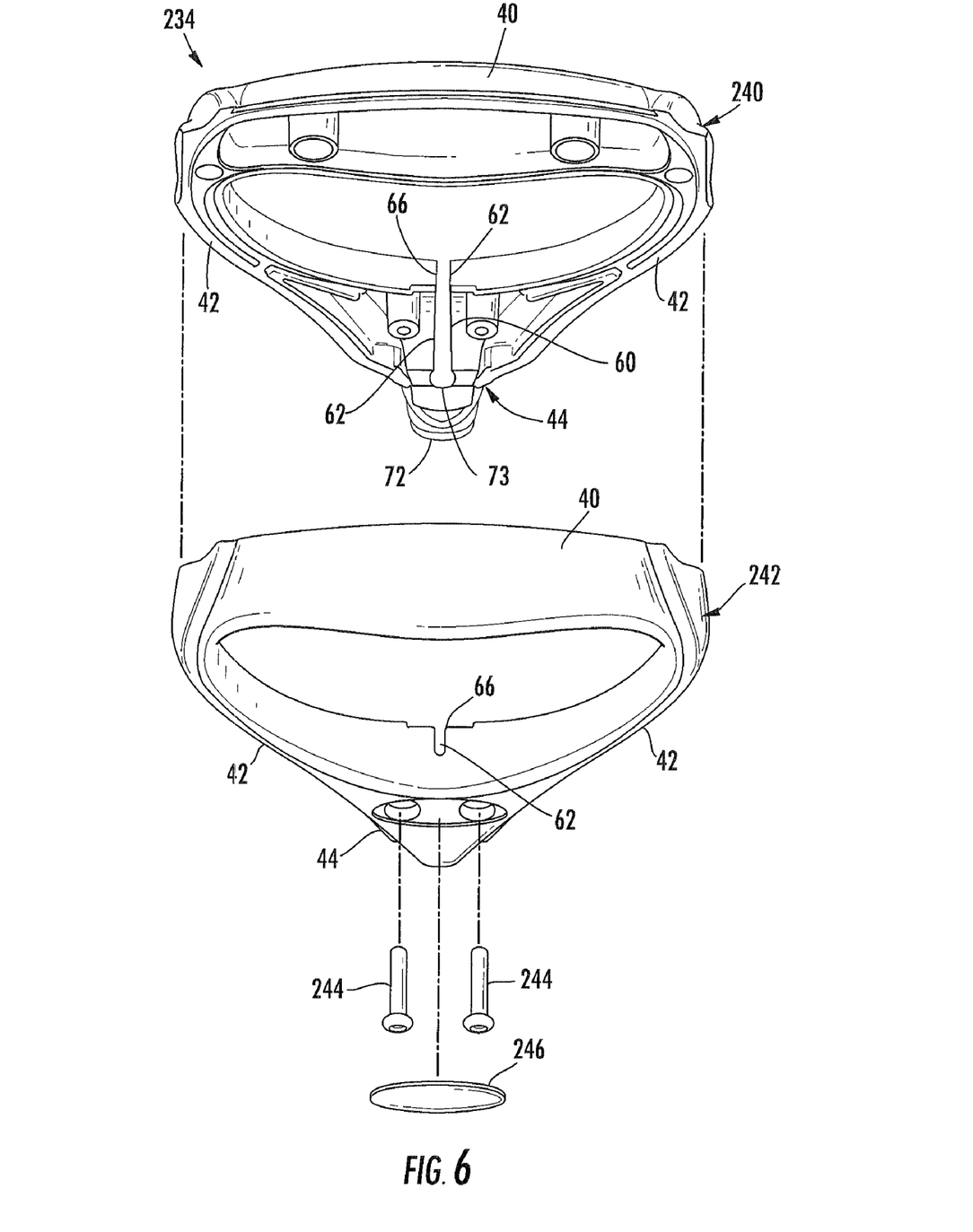
FIG. 6 is a top front perspective view of the handle of FIG. 5 according to an example embodiment.
Figure 7:
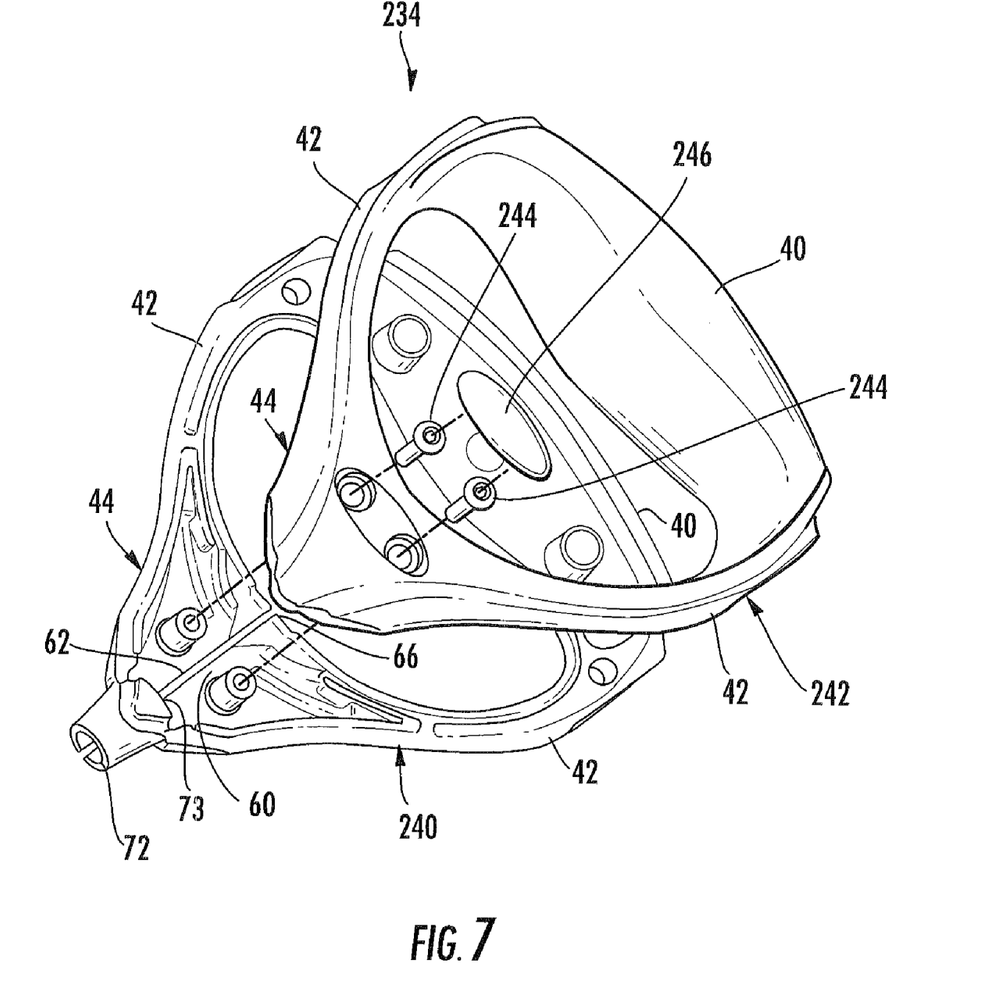
FIG. 7 is a rear perspective view of the handle of FIG. 5 according to an example embodiment.
Figure 8:
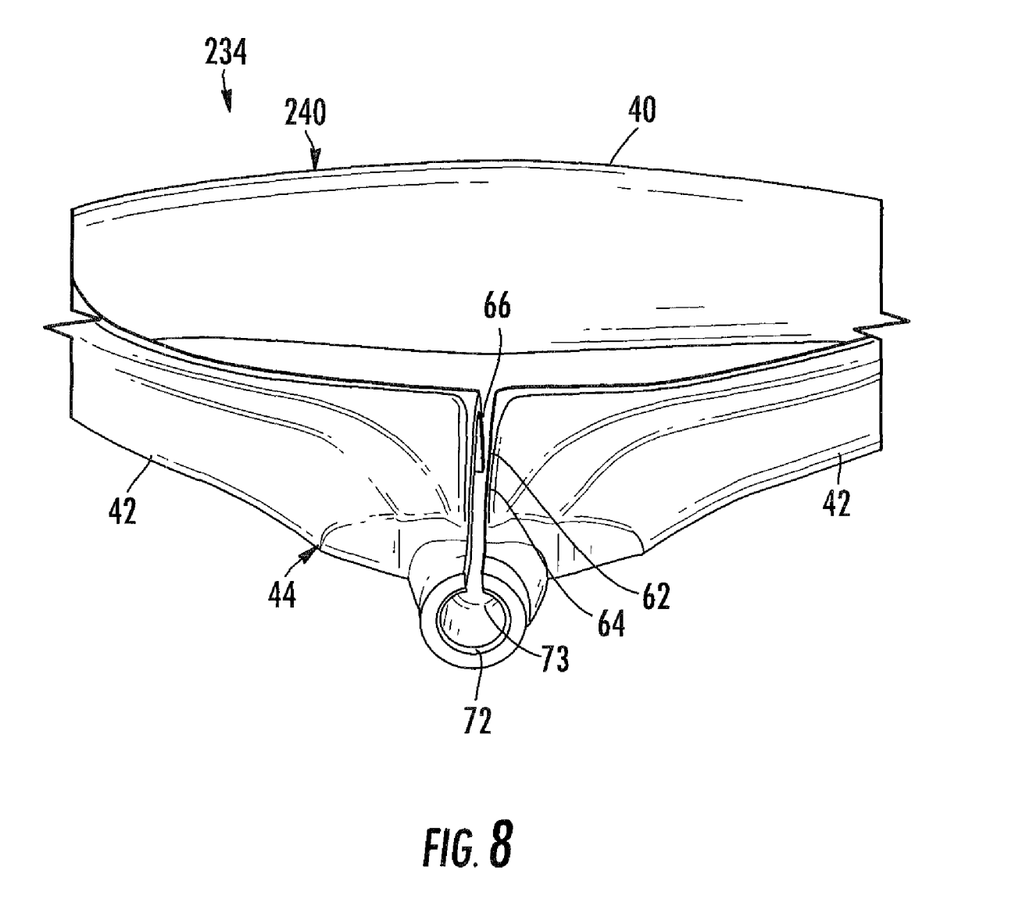
FIG. 8 is a bottom perspective view of a rear half of the handle of FIG. 5 according to an example embodiment.

FIGS. 4A, 4B 4C illustrate one example of how handle 34 facilitates easy replacement of an existing handle 100. In particular, with previous designs, a user was required to cut the cord connected to the existing and a 100 to facilitate securement of the cord to a replacement handle. Unfortunately, this often resulted in the cord being inadvertently or accidentally retracted or recoiled entirely into engine 18 (shown in FIG. 1). As shown in FIGS. 4, handle 34 reduces the risk or likelihood of such an outcome.

As shown in FIG. 4A, a knot 104 is made in cord 32 while cord 32 is attached to the handle 100 to be replaced. Handle 100 is pulled through the opening 54 form by legs 42 and beam portion 42 position not 104 over throat 60 above slit 62.

As shown in FIG. 4B, knot 104 is pulled in the direction indicated by arrow 110 through slit 62 into throat 60, wherein knot 104 is captured within throat 60 due to the reduced size of opening 72. Prior to pulling of knot 104 into throat 60 or after insertion of knot 104 into throat 60, the original handle 100 (shown in FIG. 4A) is severed or otherwise removed from cord 32. Because handle 100 is not severed or removed from cord 32 until cord 32 is looped through opening 54 and not 104 is either held against slit 62 over throat 60 or is captured within throat 60, there is a reduced likelihood of cord 32 accidentally being retracted entirely into and about engine 18 (shown in FIG. 1).

As shown in FIG. 4C, the process is completed by knot 104 (shown in FIG. 4B) being pulled through throat 60 until not 104 bears against the constriction provided by opening 72. Any remaining portions of cord 32 which initially extend between not 104 and original handle 100 are received within throat 60 or those portions of the project beyond throat 60 maybe severed.

FIGS. 5-8 illustrate handle 234, another embodiment of handle 34. Handle 234 is similar to handle 34 except that handle 234 is specifically disclosed as being formed from a pair of handle halves 240, 242 which are joined together to form handle 234. The remaining elements of handle 234 which correspond to elements of handle 34 are numbered similarly. In the example illustrated, halves 240 and 242 are joined by fasteners 244 comprising screws or bolts which may be concealed by a pat or cover 246 which is adhesively applied over such fasteners 244. In other embodiments, halves 240, 242 may be joined by other fasteners or may be joined in other manners such as by welding, adhesives, bonding, integral snap fit mechanisms and the like. For example, in another embodiment, halves 240, 242 may alternatively be integrally molded as a clam shell, wherein halves 240, 242 are connected by an integral flexible hinge ("living hinge") or a mechanical hinge, permitting halves 240, 242 to be pivoted against one another and subsequently secured and retained against one another by fasteners, bonding, welding, snap fit mechanisms and the like.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

The invention claimed is:

1. A method comprising:
   forming a knot in a cord of a recoil cable between an existing handle and an engine;
   passing a length of the cord, existing between the formed knot and the engine, in a first direction through an elongate slit of a replacement handle into a throat in a neck portion of the replacement handle and across a mouth of the neck portion;
   severing the existing handle from the knot; and
   pulling the cord in a second direction perpendicular to the first direction to move the knot across elastomeric lips surrounding the mouth of the neck portion to flex the lips and to move the knot into the throat, wherein the lips serve to capture the knot within the throat.

2. The method of claim 1, wherein the pulling of the cord to move the knot across the elastomeric lips occurs prior to the step of severing the existing handle from the knot.

3. A method comprising:
   forming a knot in a cord of a recoil cable between an existing handle and an engine;
   passing a length of the cord, existing between the formed knot and the engine, in a first direction through an elongate slit of a replacement handle into a throat in a neck portion of the replacement handle and across a mouth of the neck portion;
   severing the existing handle from the knot; and
   pulling the cord in a second direction perpendicular to the first direction to move the knot through a mouth of the neck portion to move the knot into the throat.

4. The method of claim 3, wherein the replacement handle includes a beam portion configured to be grasped by fingers of a user.

5. The method of claim 4, wherein the replacement handle further includes a pair of spaced legs extending between the beam portion and the neck portion.

6. The method of claim 3, wherein the throat has a width configured to receive the cord and the knot and wherein the replacement handle further includes opposite to the mouth, the axial opening being sized to permit passage of the cord and being sized smaller than the knot so as to capture the knot within the throat.

7. The method of claim 3, wherein the slit extends along an entirety of the throat.

8. The method of claim 3, wherein the replacement handle includes at least one elastomeric flap along and over the slit, wherein the flap extends over the slit so as to resiliently flex during reception of a cord through the slit.

9. The method of claim 3, wherein the replacement handle includes a pair of elastomeric flaps along opposite sides of the slit, wherein the flaps have opposing edges configured to resiliently flex during reception of a cord through the slit.

10. The method of claim 9, wherein the slit has opposite edges spaced by a distance greater than a width of the cord to be received by the slit and wherein the neck portion further comprises at least one elastomeric flap along and over the slit, wherein the flap extends over the slit so as to resiliently flex during reception of the cord through the slit.

11. The method of claim 3, wherein the slit has opposite edges spaced a distance less than or equal to a width of a cord to be received by a slit and wherein the neck portion is configured to resiliently flex under manually applied force resulting from the cord being tensioned along the slit to spread the edges apart to a spacing greater than or equal to a width of the cord in tension.

12. The method of claim 3, wherein the replacement handle includes elastomeric lips along the edge of the mouth and wherein the throat is sized to receive the knot with the knot being out of contact with the elastomeric lips.

13. The method of claim 3, the replacement handle is formed by a pair of joined halves, each half defining a portion of the throat.

14. The method of claim 3, wherein the pulling of the cord to move the knot across through the mouth occurs prior to the step of severing the existing handle from the knot.

* * * * *